United States Patent
Bihr et al.

(10) Patent No.: US 7,256,934 B2
(45) Date of Patent: Aug. 14, 2007

(54) TILTING SYSTEM FOR AN OBSERVATION DEVICE AND AN OBSERVATION DEVICE

(75) Inventors: Joachim Bihr, Dirgenheim (DE); Alfons Abele, Schwäbisch-Gmünd (DE)

(73) Assignee: Carl-Zeiss-Stiftung, Oberkochen (DE)

( * ) Notice: Subject to any disclaimer, the term of this patent is extended or adjusted under 35 U.S.C. 154(b) by 94 days.

(21) Appl. No.: 10/821,623

(22) Filed: Apr. 9, 2004

(65) Prior Publication Data
US 2004/0263958 A1   Dec. 30, 2004

(30) Foreign Application Priority Data
Apr. 9, 2003 (DE) ............................... 103 16 242

(51) Int. Cl.
*G02B 23/00* (2006.01)
(52) U.S. Cl. .................. 359/431; 359/384; 359/831
(58) Field of Classification Search ........ 359/368–390, 359/431–432, 831–837, 399–409
See application file for complete search history.

(56) References Cited

U.S. PATENT DOCUMENTS

| 4,643,541 A | * | 2/1987 | Matsubara | 359/384 |
| 4,652,094 A | * | 3/1987 | Kitajima | 359/375 |
| 5,543,962 A | * | 8/1996 | Kitajima et al. | 359/384 |
| 5,764,408 A | * | 6/1998 | Otaki | 359/368 |
| 5,822,114 A | * | 10/1998 | Hanzawa | 359/380 |

FOREIGN PATENT DOCUMENTS

CH   560908   4/1975

OTHER PUBLICATIONS

Hecht et al, "Optics" Textbook, Addison-Wesley Publishing Company, Dec. 1976, pp. 134 and 136.*

* cited by examiner

*Primary Examiner*—Thong Q Nguyen
(74) *Attorney, Agent, or Firm*—Kriegsman & Kriegsman

(57) ABSTRACT

A tilting system for an observation device, in particular for a microscope, with at least one objective device and at least one optical device for passing at least one beam path from an entrance region to an exit region of the tilting system is described, wherein the optical device has at least one optical element in the form of a prism for tilting and for image reversion of the beam path as well as for guiding it further into at least one ocular device. According to the invention, a particularly cost-favorable and structurally simple configuration of the tilting system with a mechanical structural length that is simultaneously as small as possible is provided by configuring the optical elements for tilting the beam path as well as at least one prism for image reversion in a special way and by arranging them in a specific manner relative to one another in the beam path. In addition, an observation device with a corresponding tilting system is described.

11 Claims, 10 Drawing Sheets

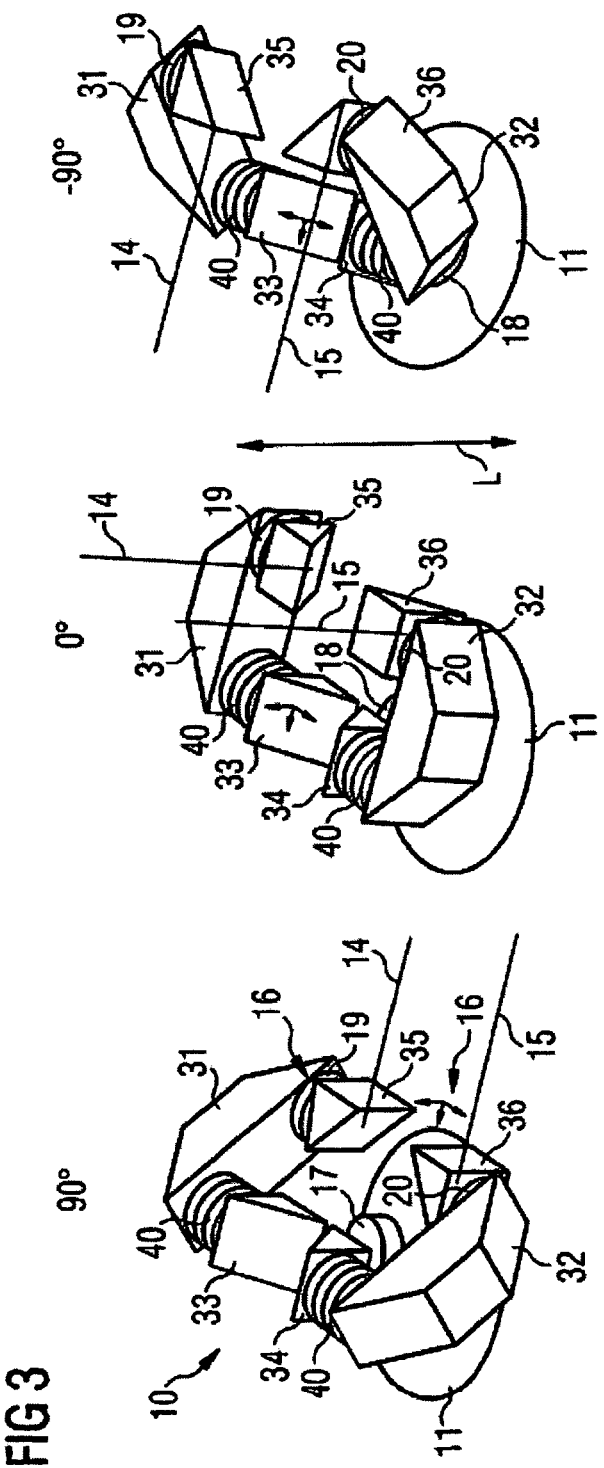

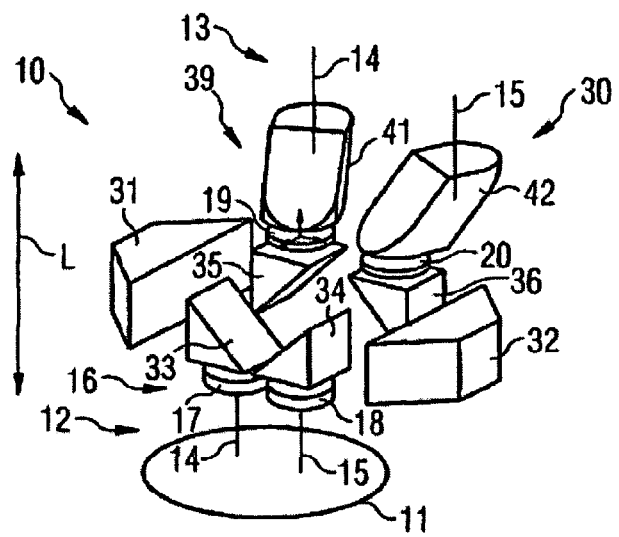

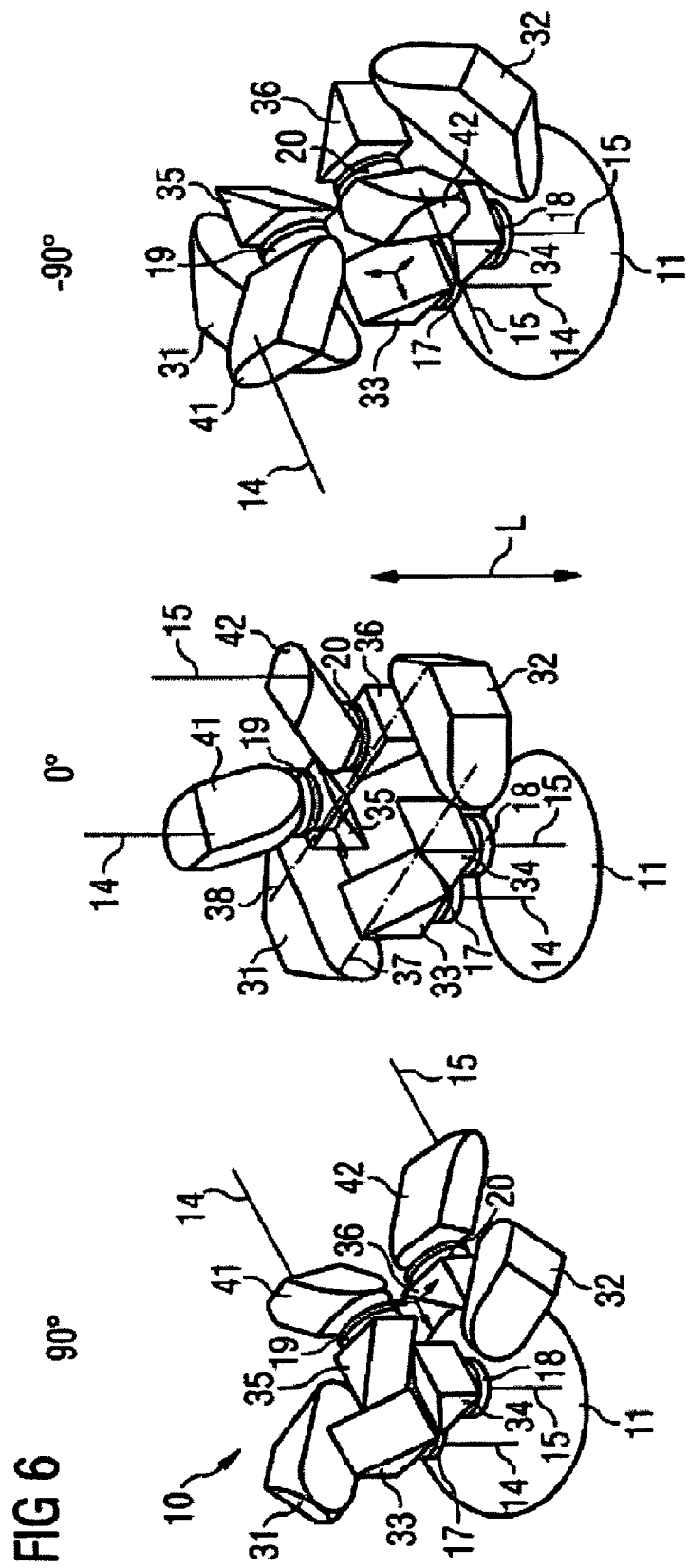

Drawn rotated 90°

Swinging axes

TILTING SYSTEM FOR AN OBSERVATION DEVICE AND AN OBSERVATION DEVICE

BACKGROUND OF THE INVENTION

The present invention first of all concerns a tilting system for an observation device, in particular for a microscope, with at least one objective device and at least one optical device for the passage of at least one beam path from an entrance region to an exit region of the tilting system, wherein the optical device has at least one optical element in the form of a prism for tilting and for image reversion of the beam path as well as for guiding it further into at least one ocular device. In addition, the invention concerns an observation device, which can involve, for example, a microscope, a telescope or the like.

Microscopes can be utilized in the most varied fields. For example, medicine represents one field for the application of microscopes. Here, microscopes are utilized, for example, as operating microscopes and the like. Such microscopes generally represent an important aid when involved in a targeted and exact surgical approach during an operation. Microscopes will provide an upright, true-to-side, enlarged image, particularly when they are used as operating microscopes. Preferably, such microscopes are configured as stereomicroscopes for two beam paths that run parallelly to one another and independent of one another, so that a stereoscopic image is communicated to the observer. If a microscope is used, for example, as an operating microscope, depth localization for guiding the surgical instrument can be facilitated for the surgeon in this way. In order to assure an endeavor that does not produce fatigue, in addition, the image must have no imaging defects. An ingenious optical system with high-quality lenses and prisms is required to fulfill these requirements.

A microscope basically comprises a number of different components, wherein one of these components is the so-called body tube. The tube usually has at least one objective element that generates an image in its focal point. This generated image is then tilted via other optical elements and further conducted to an ocular device. It may also be provided that the generated image is reversed in the tube. The image can then be observed—preferably magnified again—by means of a downstream ocular device. In addition, the ocular device can be configured for the purpose of compensating for possibly defective eyesight of the users of the observation device. The ocular device can either be a component of the swing-in tube, or may be present as a structural element that is independent of the swing-in tube.

A binocular body for a microscope or telescope is known from CH Patent 560,908. A stereoscopic (3-dimensional) image can be generated by means of such a binocular body, wherein a beam path is used separately for each eye (binocular property). This known binocular body is installed in an observation device and generates two beam paths from an object which is observed. Each beam path first passes through a 90° prism and is deflected by 90° in this prism. Then each beam path passes through an objective device. The objective device generates real images which can be observed with an ocular device. Optical elements of an optical device are provided in each beam path between the objective device and the ocular device and these elements serve first of all as deflecting means. The entering beam is deflected to the exiting beam by means of the deflecting means. The optical elements involve, for example, mirrors or prism systems. For example, a pentagon prism containing a ridge and a half-cube prism are provided for each beam path. Another prism is provided in the ocular device and this prism tilts the exiting light beam once more by 90°.

In addition to the optical tasks, the magnification, the tilting of the beam path and the possible compensation for defective eyesight of an observer, usually a variable tilting of the beam path by a tube into different viewing positions, is still required. In this way, it is possible for the user to tilt an observation device, for example, a microscope, into a position that is favorable for him, when the device is equipped with an appropriate tube—which involves in this case a swing-in tube—in order to simultaneously maintain a favorable viewing angle with the tube. In the case of a swing-in tube, one speaks of a 0° viewing angle, if the beam exiting from the tube is parallel to the entering beam. Each time depending on the type of tube, the viewing angle can be adjusted by a specific angle in the positive and negative directions. The positive swing-in angle thus corresponds to the direction toward the user, and the negative direction is away from the user.

As in many fields, miniaturization is becoming increasingly important in connection with such observation devices. Above all, the need for functional units that are becoming increasingly smaller has grown dramatically due to the increasing complexity of equipment, for example, due to required additional functions, as well as due to constantly increasing safety specifications and the like.

SUMMARY OF THE INVENTION

Proceeding from the named prior art, the object of the present invention is thus to reconfigure a tilting system for an observation device of the type given initially such that, first of all, it can be produced in a cost-favorable and structurally simple manner, wherein the tilting system will have simultaneously a minimal mechanical structural length. In addition, a correspondingly improved observation device will be provided.

This object is solved according to the invention by a novel tilting system as well as by an observation device that includes said tilting system. According to one aspect, the tilting system is provided for an observation device with at least one objective device and at least one optical device for passing at least one beam path from an entrance region to an exit region of the tilting system, wherein the optical device has at least one optical element in the form of a prism for tilting and for image reversion of the beam path as well as for guiding it further, wherein an optical element in the form of a 180° prism is provided for image reversion in the beam path and that the 180° prism is arranged crosswise to the tilting system extending from the entrance region to the exit region, wherein at least one deviating prism is provided in at least one beam path, upstream and downstream of the 180° prism, as viewed from the entrance region of the tilting system, wherein two axes of rotation are provided running perpendicular to the direction of the beam entering into the tilting system in its entrance region, around which the 180° prism and the at least one deviating prism are moved relative to one another, wherein the system is formed for the passage of two beam paths, whereby in each of the two beam paths at least one objective device and at least one optical device are provided and whereby a device for adjusting the distance between the two beam paths is provided in the exit region of the tilting system, wherein the device for adjusting the distance is formed as a lens system and that a lens system is provided in each of the two beam paths, and wherein the lens system is provided in at least one axis of rotation around which the 180° prism and the at least one deviating prism are moved relative to one another. Other advantages, features, details, aspects and effects of the invention result from the subclaims, the description, as well as the drawings. Features and details, which are described in connection with one of the different aspects of the invention relative to the swing-in tube, thus always apply also, of course, in connection with the other aspects of the invention relative to the swing-in tube. Likewise, features and details, which are described in connection with the swing-in tube according to the invention, also apply, of course, in connection with the observation device according to the invention and vice versa.

BRIEF DESCRIPTION OF THE DRAWINGS

The invention will now be explained in more detail based on the embodiment examples with reference to the attached drawings.

FIG. 3 shows various perspective views of the adjustment of the tilting system according to FIG. 2;

FIG. 4 shows a perspective view of a tilting system according to another embodiment of the invention;

FIG. 5 shows a schematic representation of the tilting system shown in FIG. 4;

FIG. 6 shows different perspective views of the adjustment of the tilting system shown in FIGS. 4 and 5;

DETAILED DESCRIPTION OF THE INVENTION

Figure 1:
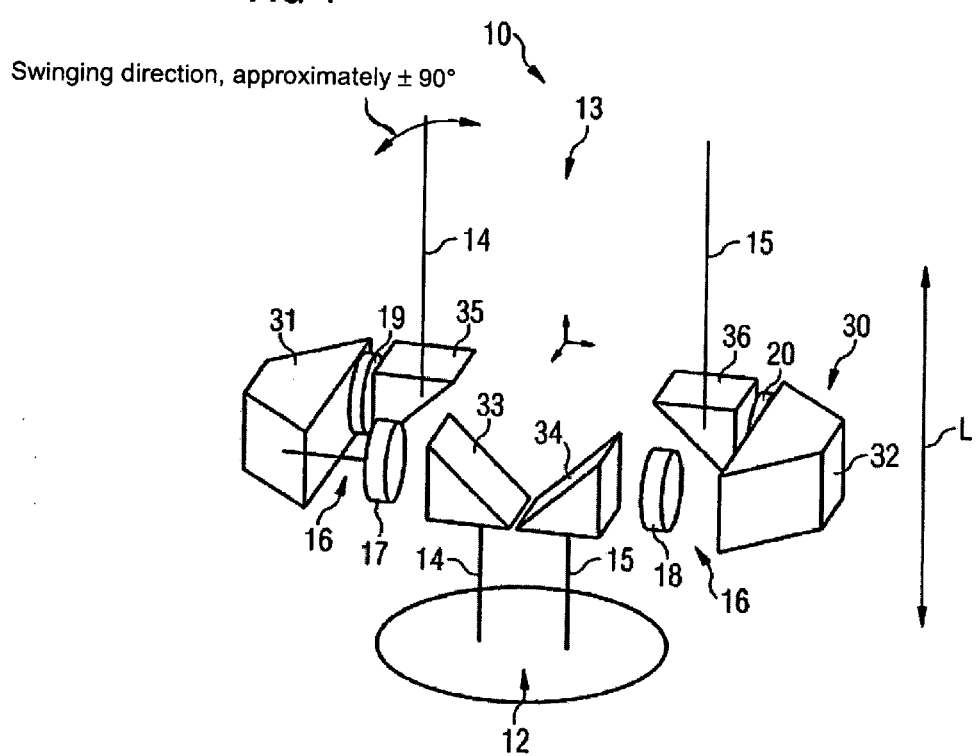
FIG. 1 shows a schematic view of a tilting system according to a first embodiment of the invention.

The central basic concept of the present invention consists of providing a movable tilting system. However, the invention is not limited to specific configurations and fields of application for the tilting system. For example, but not exclusively, the tilting system can be formed or can be used as a tube, in particular, as a swing-in tube, as a collapsible telescope or the like.

According to the first aspect of the invention, a tilting system is provided for an observation device, in particular for a microscope, with at least one objective device and at least one optical device for guiding at least one beam path from an entrance region to an exit region of the tilting system, wherein the optical device has at least one optical element in the form of a prism for tilting and for image reversion of the beam path as well as for guiding it further into at least one ocular device. The tilting system according to the invention is hereby characterized in that an optical element is provided in the form of a 180° prism for image reversion in the beam path, and that the 180° prism is arranged crosswise to the extended position of the tilting system.

This configuration of the tilting system makes it possible to be able to obtain a short mechanical structural length of the tilting system by suitable tilting of the optical beam path or beam paths, wherein at the same time, the requirement of being able to swing the tilting system remains. In addition, the tilting system can be produced in a particularly cost-favorable manner, since the use of very expensive optical elements, for example, special prisms, can be dispensed with. In particular, such a tilting system can be configured advantageously as a 180° tilting system.

It is achieved by the configuration of the tilting system according to the invention that no rotation of the image occurs when it is swung into a desired position. Rather, the image remains in an upright position during the entire movement. In addition, an image also may be rotated by the degree of swinging conducted each time with the tilting system according to the invention.

The beam path is tilted in a particular manner by the tilting system according to the invention, whereby a shorter mechanical structural length of the entire tilting system becomes possible. This is done by means of specially configured reflection prisms, as will be explained in detail later in the further course of the description, as well as by a special arrangement of the optical elements present in the optical device. Due to the particular arrangement or configuration at least of individual optical elements, the beam path is shifted into the width of the tilting system, whereby its mechanical end, that is, its exit region, moves closer to the observation device. In addition to the short structural length, a cost-favorable and simple construction of the individual optical elements is possible with simultaneously good optical quality, by means of the tilting system according to the invention.

A basic concept for the tilting system according to the invention consists of the fact that separate optical elements that were previously necessary for image reversion, for example, special prisms, can be dispensed with, since such an image reversion can already be achieved by a suitable arrangement of the remaining optical elements. The image reversion is achieved according to the invention by the fact that the 180° prism—previously arranged lengthwise—is now arranged crosswise to the extended position of the tilting system. The extended position thus corresponds to the dimension of the tilting system from its entrance region up to its exit region. The entrance region of the tilting system involves the region which adjoins the observation device. In the entrance region, the tilting system is joined with the observation device, for example, via a suitable interface. The exit region of the tilting system involves that region in which the beam path exits the tilting system and, for example, enters into a subsequent ocular device.

Advantageously, the optical elements used in the tilting system can be configured in the form of prisms. This applies both to the aspect of the invention described here, as well as also to the other aspects of the invention explained below.

Reflection prisms can be used particularly advantageously for tilting an optical beam path, since, with the help of the total reflection, they do not have reflection losses, in contrast to mirror surfaces. Due to their structural form, reflection prisms can be particularly easily introduced on a mount and then can be well adjusted, operations that would require a greater expenditure in the case of mirror surfaces.

Advantageously, at least one deviating prism can be provided in the beam path, viewed from the entrance region of the tilting system, upstream and/or downstream of the 180° prism. These deviating prisms have the task of tilting the beam path passing through the swing-in tube in the manner provided each time. However, the invention is not limited to specific types of deviating prisms. For example, but not exclusively, the at least one deviating prism can be configured as a 90° prism. A 90° prism involves a type of prism, which deflects a beam path by 90° to one side and mirrors the input image at one axis. Likewise, it is possible that the deviating prism is configured as a 90° mirror.

Advantageously, two axes of rotation can be provided running perpendicular to the direction of the beam entering the tilting system in its entrance region, around which axes the 180° prism and the deviating prisms are moved relative to one another. In this way, it can be assured that a swinging to the desired extent is also possible with the tilting system, without the occurrence of a rotating movement of the image. For example, due to the above-described configuration of the tilting system, it is possible to design the latter in the form of a 180° tilting system, so that due to the named arrangement, a swinging by the desired plus or minus 90° is possible in such a case. This swinging is provided around both axes of rotation, which are coupled preferably with one another in an appropriate manner for this purpose.

The 180° prism arranged crosswise in the first axis can be deflected upward or downward, for example, from its horizontal position, by 45° each time. Relative to this, a deviating prism moves simultaneously in the second axis of rotation, also by 45° each time. Together, these actions produce the required angle of plus or minus 90°.

Advantageously, the tilting system can be designed for passing through two beam paths, whereby at least one objective device and at least one optical device are provided in each beam path. In this way, a stereoscopic (3-dimensional) image can be produced by means of the tilting system, wherein one beam path is separately generated and is used for each eye of the user (binocular property).

In addition, it is advantageously provided that a device for adjusting the distance between the two beam paths is provided in the exit region of the tilting system. This preferably involves a device for adjusting the pupil distance (pupil distance=distance between the two eyes) of the user of such a tilting system.

The adjustment can be provided, for example, via a central adjusting knob.

The invention is not limited to specific design variants of the device for adjusting the distance between the two beam paths. For example, but not exclusively, the device for adjusting the distance can be designed as a lens system, and, advantageously, a lens system is provided in each beam path. However, cases of application are also conceivable in which only one such lens system is provided in a single beam path. Such a lens system generates a beam path that is non-finite/infinite. Therefore, it is possible by the use of a lens system to actuate a linear displacement without causing a shift of the image position. In order to adjust a desired distance, the optics used in the lens system for both beam paths must be moved synchronously outward or inward.

Preferably, the lens system is provided in at least one axis of rotation, around which the 180° prism and the deviating prism can be moved relative to one another.

In another configuration, the device for adjusting the distance can be formed in such a way that at least one rhombic prism that can be rotated around an axis of rotation is provided in the beam path upstream of the exit region of the tilting system. A rhombic prism is basically characterized by the fact that it does not generate an image rotation, but rather an image displacement is produced, which is established via the size of the prism. A rhombic prism additionally has the advantage that it is particularly insensitive in the case of adjustment and that its production is associated with particularly low manufacturing costs.

Unlike a lens system, when a rhombic prism is used, the linear movement is replaced by a rotational movement, so that other expensive structural elements are not needed for this movement. The use of a rhombic prism has the advantage that this optical element does not generate a rotation of the image, since this is achieved by the 180° prism placed upstream.

The rhombic prism is placed in the beam path, preferably at the last optical element of the optical device and produces an image displacement. Thus it is possible to adjust the desired distance by a rotational movement of the rhombic prism.

Of course, other embodiments of the device for adjusting the distance are also conceivable, such as those which will be described below in connection with the other aspects of the invention, so that the corresponding embodiments are referred to in this respect also and reference is made to these herewith.

Advantageously, the objective device can have at least one positive and at least one negative objective element. In this case, the objective elements are comprised of appropriately configured lenses or lens systems, for example. Advantageously, the positive objective element can be provided in the entrance region of the beam path in the tilting system.

The negative objective element can be provided in the beam path at different sites. For example, it is conceivable that the negative objective element is provided in the beam path after the 180° prism, viewed from the entrance region of the tilting system.

It may also be provided that the negative objective element is placed in the beam path between the 180° prism and the subsequent deviating prism. In another configuration, the negative objective element may be provided in the beam path between the deviating prism following the 180° prism and the rhombic prism. Preferably, the negative objective element can lie in the axis of rotation of the rhombic prism. It is achieved therewith that the negative objective element lies closer to the intermediate image produced in the tilting system.

According to a second aspect of the invention, a tilting system is provided for an observation device, in particular for a microscope, with at least one objective device and at least one optical device for guiding at least one beam path from an entrance region to an exit region of the tilting system, wherein the optical device has at least one optical element in the form of a prism for tilting and for image reversion of the beam path as well as for guiding it further into at least one ocular device. This tilting system is hereby characterized according to the invention in that at least one optical element in the form of a 180° prism is provided, which the beam passes through after it has entered the tilting system, and by which the beam is guided back in the direction of the entrance region and the at least one prism is provided for image reversion.

It is also possible by this configuration of the tilting system according to the invention to provide a particularly short mechanical structural length of the tilting system by suitable tilting of the optical beam path in order to swing the tilting system to the desired extent for any remaining requirement. In particular, it is possible to pivot it by 180° with the tilting system according to the invention. It is further assured by the configuration of the tilting system that a rotation of the image does not occur when swinging to the desired position, but rather that it remains upright during the entire movement.

Also, by means of the tilting system according to the second aspect of the invention, a solution is provided, the principle of which is based on an alternative tilting of the beam path, in order to make possible in this way a shorter mechanical structural length of the tilting system. This is achieved by a special arrangement of the optical elements employed in the tilting system, whereby the beam path is tilted in such a way that the mechanical end of the tilting system moves closer to its entrance region, which lies in the region of the observation device. In addition to providing a short structural length, the tilting system can be produced in a cost-favorable and structurally simple manner with an optical quality that is equally good.

A special prism, which will be explained below in detail in the further course of the description, is provided for image reversion. The optical device of the tilting system is, of course, configured in such a way that, after entering the tilting system, the optical beam path first passes through an optical element in the form of a 180° prism, whereby the beam path is guided back downward, i.e., in the direction of the entrance region of the tilting system, so that a shortening of the mechanical structural length of the entire tilting system is achieved. Only after passing through this 180° prism does the beam path possibly pass through other tilting elements before an image reversion subsequently occurs through an appropriate prism.

Preferably, the at least one prism for image reversion can be arranged downstream to the 180° prism in the beam path, viewed from the entrance region of the tilting system.

The invention is not limited to specific embodiments for the prism for image reversion. For example, but not exclusively, the at least one prism for image reversion can be formed as a poro prism of the second type. Such a prism is used in particular for image rotation by 180°, with additional shift of the beam path. Such a prism is designed preferably as a cemented element.

Preferably, two prisms can be provided in the beam path for image reversion.

In another configuration, at least one deviating prism can be provided in the beam path between the 180° prism and the at least one prism for image reversion. Likewise, it is, of course, also conceivable that two or more deviating prisms are provided in the beam path. Thus, the invention is not limited to specific embodiments for the deviating prism. For example, but not exclusively, the deviating prism can involve a 90° prism as has already been described above, or a 90° mirror.

In order to avoid image rotations, preferably two or more prisms can be arranged simultaneously by moving around axes of rotation. This is particularly meaningful when an image rotation cannot be obtained with a movement of the tilting system into its final position—for a 180° tilting system, for example, into the final position of plus or minus 90°.

In particular, if a poro prism of the second type is used as the prism for image reversion, the remaining optics must reproduce the initial image without rotation during the movement, i.e., an image rotation must not be introduced.

For example, it may be provided that two axes of rotation pass through the 180° prism, wherein, preferably, one axis of rotation is provided in the optical entrance beam and wherein one axis of rotation is provided in the optical exit beam of the 180° prism. The axes are preferably parallel to one another and are spaced at a distance dependent on the length of the 180° prism. If the tilting system is configured as a 180° tilting system, the first axis of rotation, for example, makes it possible that the prism is moved by plus or minus 45° The deviating prism (for example, a 90° prism) that is suspended on this prism in the second axis of rotation is moved relative thereto at the same angle in the opposite direction, so that the optical beam running toward this prism always points in the same direction.

In addition, it may be provided that the two deviating prisms can also be arranged relative to one another so that they move around one axis of rotation. This axis of rotation preferably lies in the optical beam running toward the 180° prism. Then a swinging of plus or minus 90° is executed with this rotational movement.

It is particularly provided that the rotational speed of this third axis is precisely double that of the first or second axes described above. For example, if the 180° prism is deflected by 45°, another deviating prism must thus rotate by 90° in the third axis.

Advantageously it can be provided that the tilting system is designed for the passage of two beam paths, whereby in each beam path at least one objective device and at least one optical device are provided and whereby a device for adjusting the distance between the two beam paths is provided in the exit region of the tilting system. In this way, it is achieved, first of all, that stereoscopic beam paths as have already been described above can be generated with the tilting system.

The invention again is not limited to specific embodiments of the device for adjusting the distance between the two beam paths. As has already been explained, this device particularly involves a device for adjusting the pupil distance.

For example, for adjusting the distance between the two beam paths, the at least one prism for image reversion for each beam path can be arranged so that it can rotate around an axis of rotation. Consequently, the distance is adjusted in such a case via rotational movements of the prisms for image reversion around a corresponding axis of rotation. Of course, other embodiments are also conceivable for the device, whereby in this respect, in particular, reference is made to the other configurations, which are described in connection with the other aspects of the invention relative to the tilting system.

Preferably, the objective device can be provided in the beam path upstream of the 180° prism.

In addition, in a case in which the tilting system is configured in the way described above, provision can be made that the ocular device adjoining the tilting system has available appropriate connection elements, which connect the individual ocular supports with one another, so that a constant distance is maintained between the two beam paths during the swinging movement, by means of such connection.

According to a third aspect of the invention, a tilting system is provided for an observation device, in particular for a microscope, with at least one objective device and at least one optical device for guiding at least one beam path from an entrance region to an exit region of the tilting system, wherein the optical device has at least one optical element in the form of a prism for tilting and for image reversion of the beam path as well as for guiding it further in at least one ocular device. The tilting system is hereby characterized according to the invention in that the optical elements necessary for the swinging are arranged in an axis of rotation and the at least one prism is provided for image reversion.

A short mechanical structural length of the tilting system can also be provided by this embodiment of the tilting system, with the requirement of being able to swing the tilting system in the desired way—for example, by 180°—remaining the same.

It is assured simultaneously that when swinging into the desired position, a rotation of the image does not occur, but rather the image remains upright during the entire movement.

A basic element of the tilting system according to the invention consists of the fact that the optical elements necessary for the swinging movement lie in one axis of rotation and that the rotation of the image that occurs when swinging is eliminated by an additional prism for image reversion which is incorporated in the beam path.

Advantageously, the at least one prism for image reversion can be formed as a Schmidt-Pechan prism for this purpose. Such a prism generates a mirrored image. For example, it can be achieved with such a prism that with a stationary input image and rotation of this prism in the beam path, the output image is rotated at double the velocity. A Schmidt-Pechan prism additionally has the advantage that it can be used also in a finite beam path. The prism preferably comprises two prisms which are advantageously cemented into one mount, since a parallelly running air gap must be present between the two prisms. A beam that enters and a beam that exits will not be shifted relative to one another with such a prism.

If the tilting system is configured as a 180° tilting system, it is possible, by employing a Schmidt-Pechan prism, to provide swinging by plus or minus 90° via a single axis of rotation. The entering image is reproduced by a rotational movement of the prism around its own axis at a double angle. Thus it is possible to bring back an image that has been rotated, for example, 90°, into a 0° position by a 45° rotation of this prism.

Preferably, the at least one prism for image reversion can be arranged in the beam path downstream of the optical elements necessary for swinging.

For example, it can be provided that the prism for image reversion is arranged in a rotatable manner around its own axis of rotation.

Preferably, it can be additionally provided that at least one deviating prism, and in particular, two deviating prisms is/are provided in the beam path for pivoting. Again, the invention is not limited to specific types of deviating prisms. For example, at least one deviating prism can be formed as a 90° prism, as has already been explained in detail above. In another configuration, at least one deviating prism can be formed as a 90° ridge prism. Such a 90° ridge prism corresponds to the basic form of the 90° prism and additionally has a ridge (90° edge) at the reflection surface, and this mirrors the image one more time, so that an image rotated by 180° is formed.

If such deviating prisms are used, an image rotation of plus or minus 90° usually occurs by swinging the 90° prism. This image rotation can be cancelled by rotating the prism for image reversion, for example, the Schmidt-Pechan prism by plus or minus 45° in the suitable direction. In such a case, a 2:1 coupling of the plus or minus 90° swinging axis and the axis of rotation of the Schmidt-Pechan prism is required. A ridge introduced on the 90° prism cancels the reflection occurring in the Schmidt-Pechan prism.

Preferably, the at least one prism for image reversion and the optical elements necessary for swinging can be arranged in one and the same swinging axis. The structural length of the tilting system can thereby be reduced by tilting the beam path into the width of the tilting system.

In another configuration, two deviating prisms can be provided for each beam path, wherein the at least one prism for image reversion is provided in the beam path between the two deviating prisms.

Preferably, two deviating prisms can be provided for each beam path, wherein one deviating prism is formed as a 90° prism and one deviating prism is formed as a 90° ridge prism, and wherein the 90° prism is provided in the beam path upstream of the 90° ridge prism, as viewed from the entrance region of the tilting system. In another configuration, two deviating prisms can be provided for each beam path, wherein again one deviating prism is formed as a 90° prism and one deviating prism is formed as a 90° ridge prism, and wherein the 90° ridge prism is provided in the beam path upstream of the 90° prism, as viewed from the entrance region of the swing-in tube. In the last-named case, the axis of rotation lies closer to the entrance region of the tilting system.

Preferably, the tilting system for the passage of two beam paths can be formed, whereby in each beam path at least one objective device and at least one optical device are provided, and whereby a device for adjusting the distance between the two beam paths is provided in the exit region of the tilting system. In this way, stereoscopic beam paths can be generated in the tilting system-similar to those in the aspects of the invention described above. In this case also, the invention is not limited to a specific device for adjusting the distance between the two beam paths, so that in this respect, in addition to the examples described below, reference is made in particular also to the corresponding embodiments in connection with the other aspects of the invention and reference is made to these herewith.

For example, the device can have at least one rhombic prism for adjusting the distance for each beam path. For this purpose, in particular, refer to the embodiments for the tilting system according to the first aspect of the invention. The objective device provided in the tilting system can be provided in the beam path, for example, upstream or downstream of the first deviating prism, as viewed from the entrance region of the tilting system. In another configuration, it can be provided that the objective device has at least one positive and at least one negative objective element, that the positive objective element is provided in the beam path upstream or downstream from the first deviating prism, as viewed from the entrance region of the tilting system, and that the negative objective element is provided in the beam path upstream of the device for adjusting the distance between the two beam paths, as viewed from the entrance region of the tilting system.

The tilting system according to the above-described three aspects of the invention is particularly formed for two beam paths to pass through, wherein an objective device and at least one optical device, which have the above-described features, are provided in each beam path. In this way, the tilting system is particularly advantageously able to generate stereoscopic beam paths, so that the tube can be utilized in particular as a binocular body in a stereoscopic observation device, for example, in a stereomicroscope or the like. In such a case, preferably two identical beam paths are provided in the tilting system, in which the identical optical elements are provided for each of these and are identically arranged.

Preferably, the ocular device can be a component of the tilting system. Of course, it is also conceivable that the ocular device is formed as a component independent of the tilting system. In such a case, the tilting system must be combined in a suitable way with the ocular device during operation; for example, it must interact optically.

The tilting system is particularly advantageously formed as a 180° tilting system. Of course, other types of system are also conceivable. For example, it is also possible that the tilting system is formed as a 60°, 90°, or 120° tilting system or the like.

Advantageously, the tilting system also has an interface for fastening to an observation device. In this way, it is possible to place the tube on an observation device. The interface may have, for example, an "annular dovetail" introduced on the tilting system. In such a case, a corresponding counter-piece can be provided, which sits solidly on the housing of the observation device. The term "annular dovetail" stands for a dovetail connection which is arranged on a circular path. The tilting system is placed on the observation device and then rigidly joined via suitable fastening means, for example via a setscrew sitting thereon. The tilting system, in addition, can have suitable securing means—for example, a corresponding chamfer or slot—which secures the tilting system against twisting.

A tilting system as described above can be used, for example, in an observation device, for example, in a microscope, e.g., an operating microscope or the like. Of course, it is also possible that the tilting system is applied in other observation devices, for example, in a telescope or the like.

According to another aspect of the invention, an observation device, in particular a microscope or a telescope is provided, with a base body and a tilting system according to the invention, as described above.

A microscope designed as an operating microscope is described below as an example, in which a corresponding tilting system is embodied in the form of a swing-in tube. An operating microscope basically comprises several components: the tube, the base body and possibly also a stand. Additionally, it is possible in many operating microscopes to connect different added modules, such as, for example, a co-observer tube for an assistant observer, a videocamera for documentation or the like.

Several assemblies can also be combined inside the base body, such as, e.g., an illumination device, a magnification device, the principal objective, or the like.

The characteristic dimension for the principal objective is its focal depth, which establishes the working distance from the operating microscope to the surgical field and thus has an influence on the total magnification of the microscope.

After the principal objective, the magnification device usually follows. For example, this can involve a device that changes the magnification by which means different magnifications can be adjusted. In many cases of application, one stepwise changing device is fully sufficient. However, it is also possible to use pancratic magnification systems as the magnification device, by means of which a step-free magnification (zoom system) is possible.

In addition, such an operating microscope generally makes available an ocular device, which can be formed either as a component of the swing-in tube, or as a device independent of the swing-in tube. The task of the ocular device is generally the post-magnification of the intermediate image forming in the tube, as well as perhaps compensating for the possible defective eyesight of the user of such a microscope.

In the representations shown in FIGS. 1 to 14, a tilting system 10 is formed as a swing-in tube, which can be utilized, for example, in connection with an operating microscope. The operating microscope, which is not shown explicitly, may be a stereomicroscope, so that the swing-in tube 10 shown in the figures is configured in such a case as a binocular tube. This means that two beam paths 14, 15, which are independent of one another, pass through the swing-in tube each time, wherein these beam paths 14, 15, however, run as stereo beam paths. The beam paths 14, 15 enter into an entrance region 12 in the swing-in tube 10, and leave it in an exit region 13.

In entrance region 12, the swing-in tube 10 is connected to the operating microscope each time by means of a suitable interface 11. In addition, the swing-in tube 10 is connected to a suitable ocular device in the exit region 13. Depending on the configuration of the swing-in tube 10, the ocular device, which is not shown explicitly in the embodiment examples, can be provided either as a component of the swing-in tube, or as a component which is separate from this tube.

First, a swing-in tube 10 is shown in FIGS. 1 to 9, which is configured according to a first aspect of the invention.

The swing-in tube 10 first makes available an objective device 16, which is arranged in each of the beam paths 14, 15. The objective device 16 in turn provides positive objective elements 17, 18 as well as negative objective elements 19, 20. A positive objective element 17 as well as a negative objective element 19 are provided in the beam path 14, while a positive objective element 18 as well as a negative objective element 20 are provided in the beam path 15. The objective elements may be configured, for example, in a form corresponding to shaped lenses or lens systems.

In addition, the swing-in tube 10 according to FIGS. 1 to 9 makes available an optical device 30, which in turn is comprised of individual optical elements. Each beam path 14, 15 is first made available via a 180° prism 31 or 32, which is formed as a prism for image reversion. In addition, a deviating prism 33 or 34 is provided in beam path 14 or 15 upstream of the 180° prism, as viewed from the entrance region 12, wherein the deviating prisms in the present example are formed as 90° prisms. In addition, deviating prisms 35 and 36 are provided in the beam path downstream of the 180° prisms 31 and 32, and these are also formed as 90° prisms.

The basic concept for the swing-in tube shown in FIGS. 1 to 9 is to be able to dispense with the prisms that were previously separately necessary for image reversion and to achieve this especially by suitable arrangement of the remaining prisms. Thus structural length can be reduced by dispensing with these prisms. The image reversion can be achieved by arranging the 180° prisms 31, 32 in each beam path 14, 15—which were previously arranged lengthwise—now crosswise to the extended position L of the swing-in tube 10.

Figure 2:
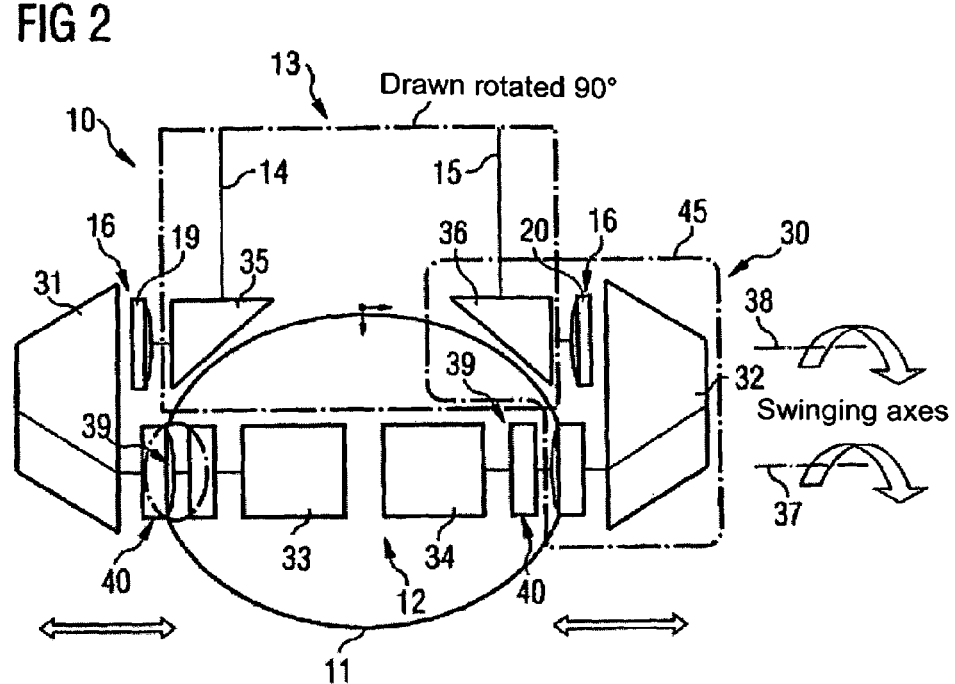
FIG. 2 shows a schematic view of a particular configuration of the tilting system shown in FIG. 1.
Figure 7:
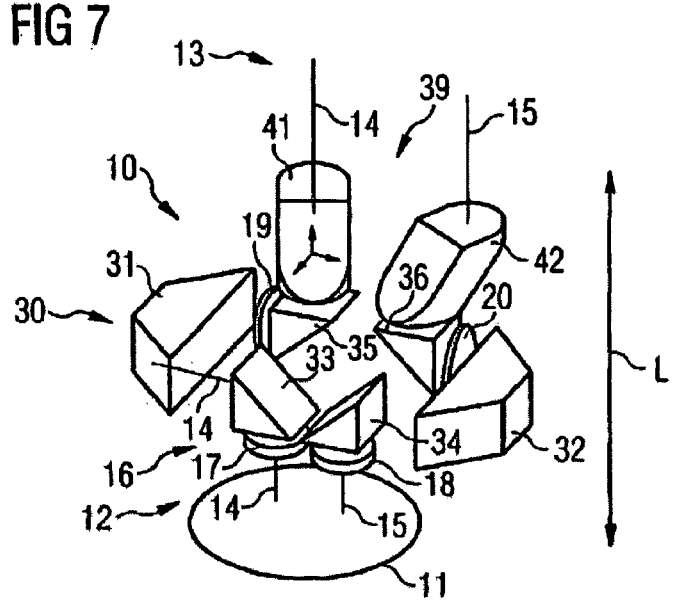
FIG. 7 shows a perspective representation of another embodiment of the tilting system according to the invention.
Figure 8:
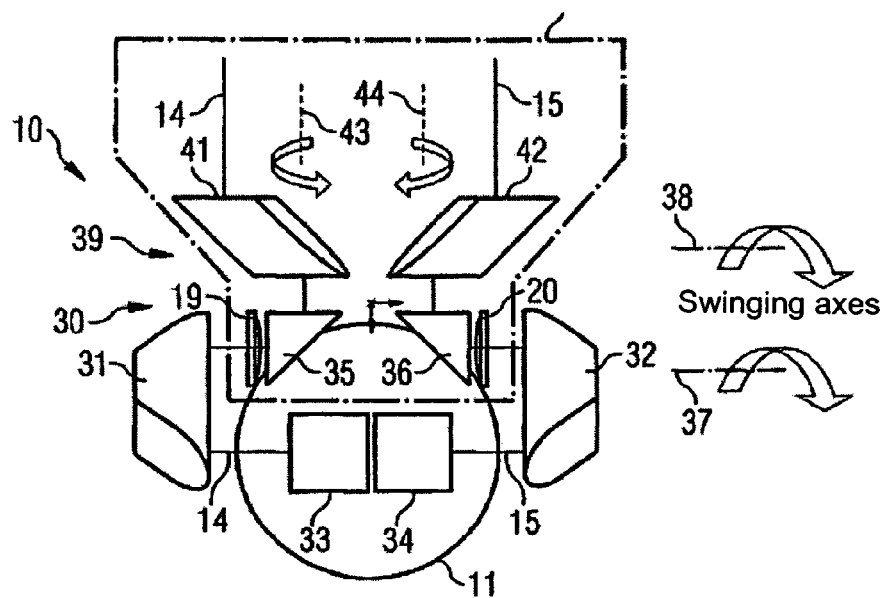
FIG. 8 shows a schematic representation of the tilting system shown in FIG. 7.
Figure 9:
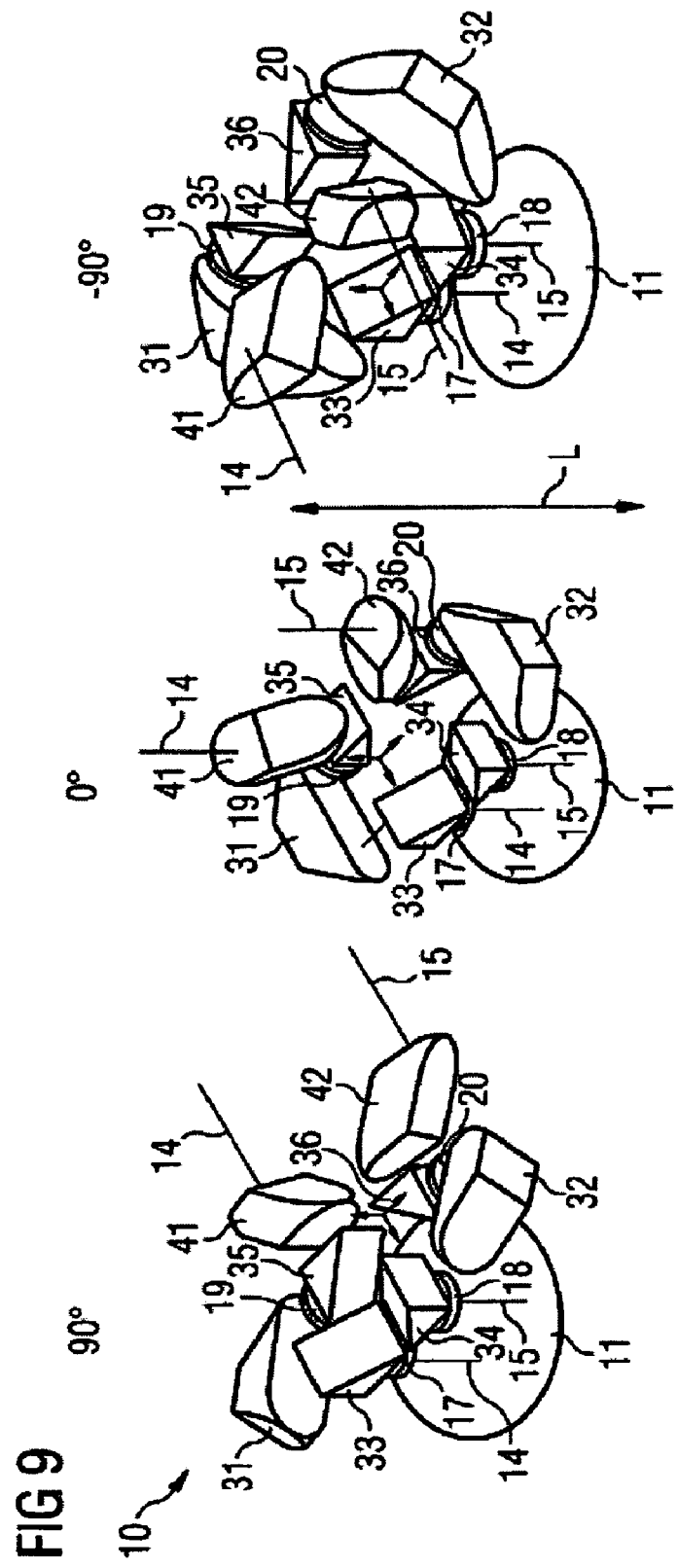
FIG. 9 shows different views of the adjustment of the tilting system shown in FIGS. 7 and 8 in perspective representation.

Now, however, in order to also assure that a swinging by the desired plus or minus 90° is also possible by means of this arrangement, without incurring a rotating movement of the image, it is provided that the swinging of the individual prisms occurs around two axes of rotation 37, 38, which are coupled with one another (FIG. 2).

The 180° prism 31 or 32 arranged crosswise in the axis of rotation 37 can be deflected upward or downward from its horizontal position by 45° each time. The 90° prism 35 or 36 in the second axis 38 moves simultaneously also by 45° each time relative thereto. Together, these actions produce the required angle of plus or minus 90°.

A great deal of mechanical structural length is spared due to the arrangement of the 180° prism 31 or 32 crosswise to the extended position L of the swing-in tube and the elimination of special prisms for image reversion.

Now, in order to also make possible an adjusting of the distance between the beam paths 14, 15 in the exit region 13 of the swing-in tube 10, which is also denoted as an adjustment of the pupil distance, it is provided according to FIGS. 2 to 9 for the swing-in tube that a special device 39 is used for this. FIGS. 2 to 9 represent a special embodiment of the swing-in tube 10 shown in FIG. 1. In FIG. 1, which reflects the basic structure of swing-in tube 10, such a device 39 is not provided.

This device 39 is formed as a lens system 40 according to FIGS. 2 and 3. Lens system 40 is incorporated in the axis of rotation 37 between the 90° prism 33 or 34 and the 180° prism 31 or 32 and produces a beam path into infinity in the rotating range of the first axis of rotation 37. Therefore, it is possible in this range to execute a linear displacement without causing a shift of the image position. Now, in order to adjust the desired distance between the beam paths 14 and 15 in the exit region 13 of the swing-in tube 10, the optics downstream of lens system 40 must be moved synchronously outward or inward for both beam paths 14 and 15. The optical elements affected by this are enclosed by a circle 45 in FIG. 2 for purposes of representation.

The embodiments shown in FIGS. 4 to 6 or 7 to 9 are based on the optics principle of the example of embodiment shown in FIGS. 1 to 3. The object of these variants of embodiment is to replace the linear movement of device 39 for adjusting the distance between the beam paths 14, 15 by a rotational movement in order to dispense with expensive structural elements for this movement. Thus it applies here that the optical structural elements used for this purpose should not produce a rotation of the image, since this has already been achieved by the prisms placed upstream, in particular by the 180° prisms 31 or 32.

Thus, a rhombic prism 41, 42 is used in the beam paths 14 or 15 of the embodiment examples according to FIGS. 4 to 9, wherein the rhombic prisms 41, 42 are each arranged so that they can rotate around axes of rotation 43, 44. The rhombic prisms 41, 42 are placed in the beam paths 14 or 15 each time at the last 90° prism 35 or 36 and generate a shifting of the image. It is thus possible to conduct the desired distance adjustment by a rotational movement of the rhombic prisms 41, 42.

As can be seen in FIGS. 4 to 9, the image rotation is not produced by the rhombic prisms 41, 42, but by the 180° prisms 31, 32 placed upstream in the beam path. The variants of embodiment shown in FIGS. 4 to 6 or 7 to 9 are only slightly different, i.e., in the arrangement of the negative objective elements 19 or 20, which lie, on the one hand, in the axis of rotation 43 or 44 of the rhombic prisms 41 or 42 (FIGS. 4 to 6) and which in FIGS. 7 to 9 lie upstream of the last 90° prism 35 or 36 in the second axis of rotation 38 for the swinging movement.

Figure 10:
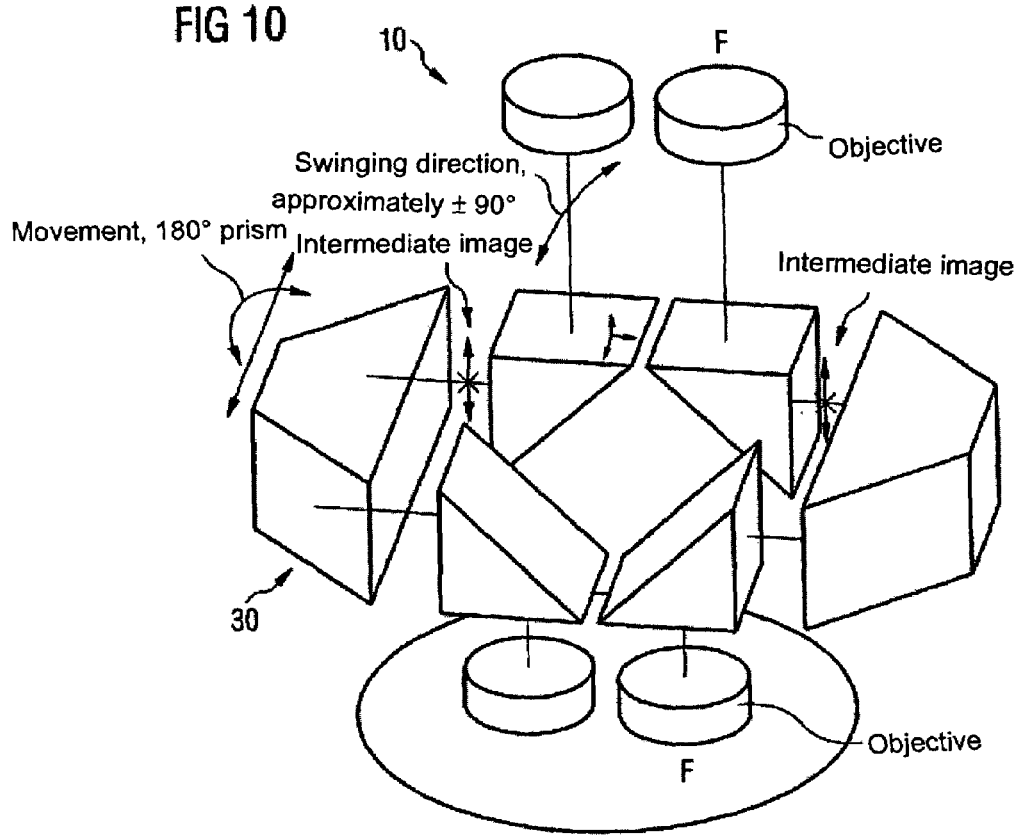
FIG. 10 shows a perspective representation of a tilting system according to the present invention, from which can be seen the basic concept of the invention of a mobile tilting system.

The principle of the mobile tilting system 10 is illustrated once more in FIG. 10, wherein, in particular, the possibilities for swinging the individual prisms can be seen. In addition, it is illustrated in FIG. 10 that a rotation of the image (shown here by the letter "F") does not occur when swinging into a desired position. Rather, the image stays in an upright position during the entire movement.

Figure 11:
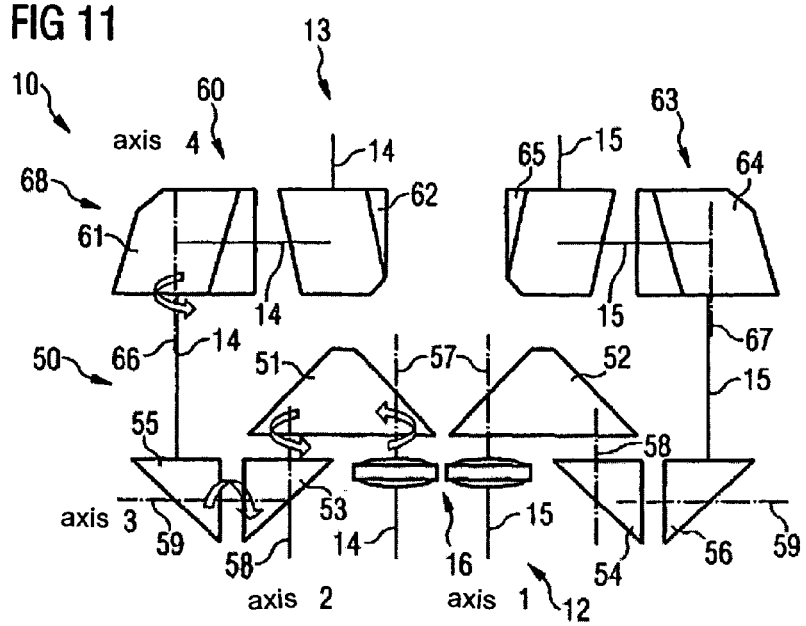
FIG. 11 shows another embodiment of a tilting system according to the present invention.

Another example of embodiment of a swing-in tube 10 is shown in FIG. 11. The swing-in tube 10 in turn provides an entry side 12 as well as an exit side 13. The two beam paths 14, 15 enter into swing-in tube 10 in the region of the entry side 12 and leave it on exit side 13. As is also the case in the embodiment examples shown in FIGS. 1 to 8, the beam paths 14, 15 each have an identical course, wherein each of these beams passes through a number of optical elements when it passes through the swing-in tube 10. Each of the beam paths 14, 15 thus passes through the same optical elements, which are also positioned in an identical way in beam paths 14, 15.

The basic concept of the swing-in tube 10 shown in FIG. 11 is based on an alternative arrangement of the optical elements used in an optical device 50.

Prisms 60 or 63 for image reversion are provided each time for image rotation. In the example of embodiment according to FIG. 11, these prisms 60 or 63 are each formed as two poro prisms of the second type 61, 62 in the beam path 14 or 64, 65 in the beam path 15. The image is completely rotated by these poro prisms of the second type.

In addition, in the example of embodiment according to FIG. 11, it is provided that the optical beam path 14, 15, after an optical device 16 formed as a convergent lens, first passes through a 180° prism 51 or 52 and only then passes through the 90° prisms 53, 55 or 54, 56 connected thereto, which adjoin the 180° prisms 51 or 52 in the beam path 14, 15. The image reversion through the poro prisms 61, 62 or 64, 65 occurs only after this.

The beam path is thus brought back down during the passage through the 180° prisms 51 or 52, i.e., in the direction of the entrance region 12 of the swing-in tube 10, so that a shortening of the entire structural length is obtained.

In order to achieve no image rotation in the movement to the final positions of plus or minus 90°, there should be the simultaneous movement of several prisms. Due to the fact that the poro prisms 61, 62 or 64, 65 will be used in this embodiment variant, the remaining optics must pass on the input image without rotation upon movement, i.e., there must be no image rotation.

During the swinging, the optics thus must rotate around several axes. Two axes pass through the 180° prisms 51 or 52, one of which lies in the optical beam which leaves the microscope (axis 57) and the other lies in the optical exit beam of the prism (axis 58). The axes 57, 58 are parallel to one another and are spaced at a distance dependent on the length of the 180° prisms 51, 52. The axis 57 makes it possible to move the prism 51 or 52 by plus or minus 45°. The 90° prism 53 or 54 that is suspended at this prism in the second axis 58 is moved relative thereto at the same angle in the opposite direction, so that the optical beam running toward this prism always points in the same direction. Then the third axis 59 lies in this beam, and the second 90° prism 55 or 56 rotates around this third axis. The swinging of plus or minus 90° is executed with this rotational movement. Therefore, the rotational speed in the third axis 59 is advantageously precisely double that in the first axis 57 or the second axis 58. For example, if the 180° prism 51 or 52 is deflected by 45°, the second 90° prism 55 or 56 must rotate by 90° in the third axis 59.

The adjustment of the distance between the two beam paths 14, 15 in the exit region 13 of the swing-in tube is preferably conducted via rotational movements of the poro prisms 61, 62 or 64, 65 around corresponding axes of rotation 66, 67.

The optical device 15 of the swing-in tube shown in FIG. 11 thus has a particularly short mechanical structural length.

Figure 12:
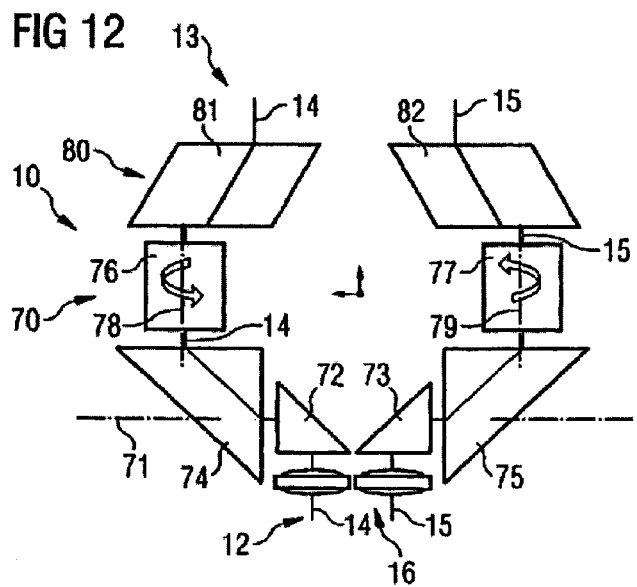
FIG. 12 shows another embodiment of a tilting system according to the present invention.
Figure 13:
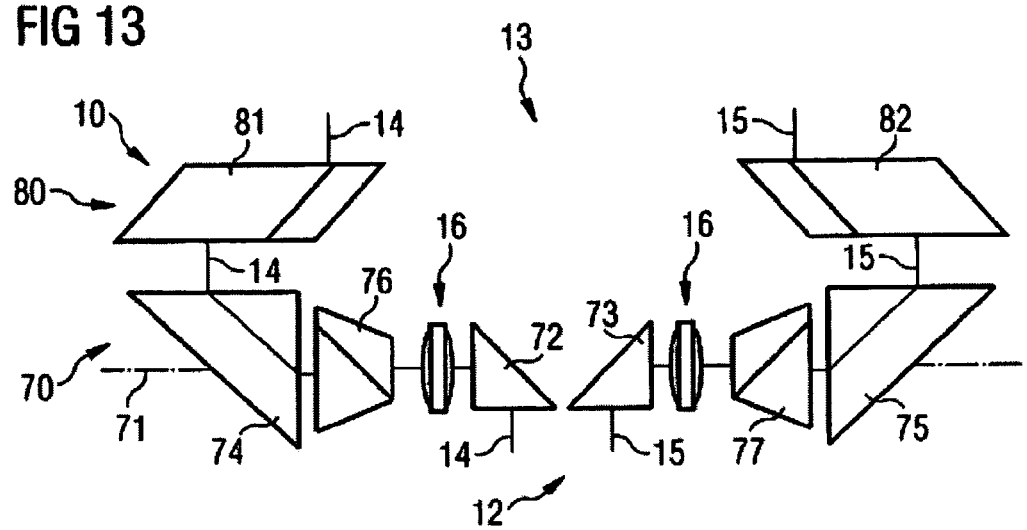
FIG. 13 shows yet another embodiment of a tilting system according to the present invention.
Figure 14:
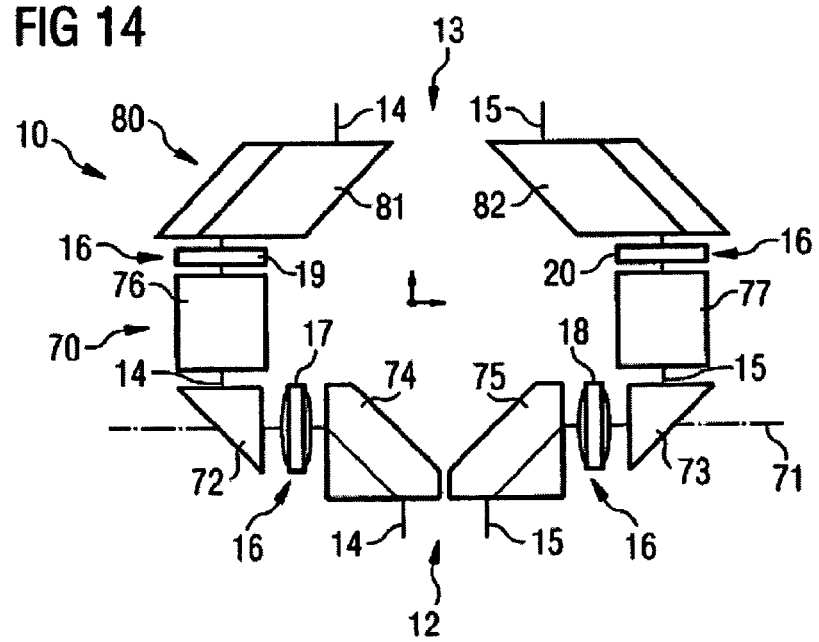
FIG. 14 shows still another embodiment of a tilting system according to the present invention.

Finally, another aspect for a swing-in tube 10 according to the present invention is shown in FIGS. 12 to 14. Again the swing-in tube 10 has an entrance region 12, into which enter two stereoscopic beam paths 14, 15. In addition, the swing-in tube 10 has an exit region 13, by means of which the beam paths 14, 15 leave the swing-in tube 10. The swing-in tube 10 in turn provides an objective device 16 as well as an optical device 70. The optical device 70 is comprised of a number of optical elements, which are configured in the form of prisms.

The objective device 16 can be formed in one part, for example, as is shown in FIGS. 12 and 13. It is likewise conceivable that the objective device 16 is formed of multiple parts, whereby in such a case, as is shown in FIG. 14, the objective device 16 can be formed each time from a positive objective element 17 or 18 as well as a negative objective element 19 or 20.

The embodiment examples shown in FIGS. 12 to 14 have in common the fact that all optical elements necessary for movement by plus or minus 90° are placed in a single axis of rotation 71 and that the rotation of the image occurring by swinging is eliminated by a prism 76, 77 additionally incorporated in beam path 14, 15. The adjustment of beam paths 14, 15 at a specific distance is conducted via a corresponding device 80, which is formed of a rhombic prism 81, 82 for each beam path 14, 15.

A prism for image reversion, which is formed as a Schmidt-Pechan prism in the embodiment examples according to FIGS. 12 to 14, is incorporated in each beam path 14, 15. This prism 76 or 77 mirrors the entering image and rotates it according to the position of the prism. The entering image is passed on at double the angle with a rotational movement of the prism 76 or 77 around an axis of rotation 78 or 79. Thus it is possible to bring back into a 0° position an image that has been rotated, for example, at 90°, by a 45° rotation of the prism 76 or 77. This is necessary in the case of the swing-in tube 10 shown in FIG. 10, since in the swinging of the 90° prisms 72 and 73 or 74 and 75, an image rotation of plus or minus 90° occurs, which must again be cancelled by rotating the Schmidt-Pechan prisms 76, 77 by plus or minus 45° in the suitable direction. For this purpose, advantageously, a two-to-one coupling of the plus or minus 90° swinging axis 71 and of the axis of rotation 78 or 79 of the Schmidt-Pechan prisms 76 or 77 is conducted. A ridge introduced on the 90° prism 74 or 75 cancels the reflection occurring in the Schmidt-Pechan prism 76 or 77.

A swing-in tube 10 constructed on the principle shown in FIG. 12, in which the image rotation during the movement is also eliminated via a Schmidt-Pechan prism 76 or 77, is presented in FIG. 13. The prism 76 or 77 is also arranged, however, in the axis of rotation 71, whereupon the structural length of the swing-in tube 10 is minimized, since the beam path 14 or 15 is tilted into the width of the swing-in tube 10. The same type and number of optical elements as in FIG. 12 is used. Only the tolerances of a few optical elements need be adapted to the modified conditions in the example of embodiment according to FIG. 13. This is true in particular for the rhombic prisms 81 and 82, which must be longer due to the shifting into the width. The function of the swing-in tube 10 shown in FIG. 13, however, corresponds to that of the swing-in tube 10 shown in FIG. 12. In the swinging by plus or minus 90° around the axis of rotation 71, the Schmidt-Pechan prisms 76 and 77 must be rotated by half the angle of rotation in the same direction, in order to obtain an upright image. The Schmidt-Pechan prism 76 or 77 is no longer swung along due to its position in the axis of rotation 71, but only the ridge prism 74 or 75 and the rhombic prism 81 or 82.

The swing-in tube 10 shown in FIG. 14 has been extensively modified in comparison to the swing-in tube 10 shown in FIG. 13, in that the 90° prisms 72 or 73 and the 90° ridge prisms 74 or 75 are exchanged. Therefore, in the embodiment variant shown in FIG. 14, the axis of rotation is closer to the interface of the swing-in tube 10 for the observation device in the entrance region 12 than in the embodiment shown in FIG. 13. The movement is produced identically to the example of embodiment according to FIG. 13, so that in this respect, reference is made to the corresponding embodiment.

It is possible to produce swing-in tubes with short mechanical structural length, which can be used in particularly advantageous manner in observation devices of all types, in a structurally simple and cost-favorable manner, by the configuration of swing-in tubes 10 according to the invention.

List of reference numbers

| | |
|---|---|
| 10 | Tilting system |
| 11 | Interface for an observation device |
| 12 | Entrance region |
| 13 | Exit region |
| 14 | Beam path |
| 15 | Beam path |
| 16 | Objective device |
| 17 | Positive objective element |
| 18 | Positive objective element |
| 19 | Negative objective element |
| 20 | Negative objective element |
| 30 | Optical device |
| 31 | Prism for image reversion (180° prism) |
| 32 | Prism for image reversion (180° prism) |
| 33 | Deviating prism (90° prism) |
| 34 | Deviating prism (90° prism) |
| 35 | Deviating prism (90° prism) |
| 36 | Deviating prism (90° prism) |
| 37 | Axis of rotation |
| 38 | Axis of rotation |
| 39 | Device for adjusting the distance between two beam paths |
| 40 | Lens system |
| 41 | Rhombic prism |
| 42 | Rhombic prism |
| 43 | Axis of rotation |
| 44 | Axis of rotation |
| 45 | Circle |
| 50 | Optical device |
| 51 | 180° prism |
| 52 | 180° prism |
| 53 | Deviating prism (90° prism) |
| 54 | Deviating prism (90° prism) |
| 55 | Deviating prism (90° prism) |
| 56 | Deviating prism (90° prism) |
| 57 | Axis of rotation |
| 58 | Axis of rotation |
| 59 | Axis of rotation |
| 60 | Prism for image reversion (poro prism) |
| 61 | First poro prism |
| 62 | Second poro prism |
| 63 | Prism for image reversion (poro prism) |
| 64 | First poro prism |
| 65 | Second poro prism |
| 66 | Axis of rotation |
| 67 | Axis of rotation |
| 68 | Device for adjusting the distance between two beam paths |
| 70 | Optical device |
| 71 | Axis of rotation |
| 72 | Deviating prism (90° prism) |
| 73 | Deviating prism (90° prism) |
| 74 | Deviating prism (90° ridge prism) |
| 75 | Deviating prism (90° ridge prism) |
| 76 | Prism for image reversion (Schmidt-Pechan prism) |
| 77 | Prism for image reversion (Schmidt-Pechan prism) |
| 78 | Axis of rotation |
| 79 | Axis of rotation |
| 80 | Device for adjusting the distance between two beam paths |
| 81 | Rhombic prism |

-continued

List of reference numbers

| | |
|---|---|
| 82 | Rhombic prism |
| L | Extended position of the tilting system |

The invention claimed is:

1. A tilting system for an observation device with at least one objective device and at least one optical device for passing at least one beam path from an entrance region to an exit region of the tilting system, wherein the optical device has at least one optical element in the form of a prism for tilting and for image reversion of the beam path as well as for guiding it further, wherein an optical element in the form of a 180° prism is provided for image reversion in the beam path and that the 180° prism is arranged crosswise to the tilting system extending from the entrance region to the exit region, wherein at least one deviating prism is provided in at least one beam path, upstream and downstream of the 180° prism, as viewed from the entrance region of the tilting system, wherein two axes of rotation are provided running perpendicular to the direction of the beam entering into the tilting system in its entrance region, around which the 180° prism and the at least one deviating prism are moved relative to one another, wherein the system is formed for the passage of two beam paths, whereby in each of the two beam paths at least one objective device and at least one optical device are provided and whereby a device for adjusting the distance between the two beam paths is provided in the exit region of the tilting system, wherein the device for adjusting the distance is formed as a lens system and that a lens system is provided in each of the two beam paths, and wherein the lens system is provided in at least one axis or rotation which the 180° prism and the at least one deviating prism are moved relative to one another.

2. A tilting system for an observation device with at least one objective device and at least one optical device for passing at least one beam path from an entrance region to an exit region of the tilting system, wherein the optical device has at least one optical element in the form of a prism for tilting and for image reversion of the beam path as well as for guiding it further, wherein an optical element in the form of a 180° prism is provided for image reversion in the beam path and that the 180° prism is arranged crosswise to the tilting system extending from the entrance region to the exit region, wherein the at least one deviating prism is formed as a 90° prism or a 90° mirror, wherein two axes of rotation are provided running perpendicular to the direction of the beam entering into the tilting system in its entrance region, around which the 180° prism and the at least one deviating prism are moved relative to one another, wherein the system is formed for the passage of two beam paths, whereby in each of the two beam paths at least one objective device and at least one optical device are provided and whereby a device for adjusting the distance between the two beam paths is provided in the exit region of the tilting system, wherein the device for adjusting the distance is formed as a lens system and that a lens system is provided in each of the two beam paths, wherein the lens system is provided in at least one axis of rotation, around which the 180° prism and the at least one deviating prism are moved relative to one another.

3. The tilting system according to claim 1, further characterized in that at least one rhombic prism that can rotate around an axis of rotation is provided in the beam path upstream of the exit region of the tilting system.

4. The tilting system according to claim 1, further characterized in that the objective device has at least one positive objective element and at least one negative objective element.

5. The tilting system according to claim 4, further characterized in that the positive objective element is provided in the entrance region of the beam path into the tilting system.

6. The tilting system according to claim 4, further characterized in that the negative objective element is provided in the beam path, downstream of the 180° prism, as viewed from the entrance region of the tilting system.

7. The tilting system according to claim 6, further characterized in that the negative objective element is provided in the beam path, between the 180° prism and the following deviating prism.

8. The tilting system according to claim 6, further characterized in that the negative objective element is provided in the beam path, between the deviating prism following the 180° prism and the rhombic prism.

9. The tilting system according to claim 1, further characterized in that the system is formed as a 180° tilting system.

10. The tilting system according to claim 1, further characterized in that the system has an interface for fastening to an observation device.

11. An observation device with a tilting system according to one of claims 1, 7-8, 9 or 10.

* * * * *